(12) United States Patent
Jiang (10) Patent No.: US 12,485,944 B2
(45) Date of Patent: Dec. 2, 2025

(54) FOLDING CART

(71) Applicant: Zhongshan Kanglaiya Trade Co., Ltd., Zhongshan (CN)

(72) Inventor: Zelian Jiang, Zhongshan (CN)

(73) Assignee: Zhongshan Kanglaiya Trade Co., Ltd., Zhongshan (CN)

( * ) Notice: Subject to any disclaimer, the term of this patent is extended or adjusted under 35 U.S.C. 154(b) by 0 days.

(21) Appl. No.: 19/218,274

(22) Filed: May 25, 2025

(65) Prior Publication Data

US 2025/0282405 A1   Sep. 11, 2025

(30) Foreign Application Priority Data

Mar. 24, 2025   (CN) .......................... 202520516166.2

(51) Int. Cl.
*B62B 3/02*   (2006.01)
*B62B 3/00*   (2006.01)
*B62B 5/06*   (2006.01)

(52) U.S. Cl.
CPC .............. *B62B 3/007* (2013.01); *B62B 3/025* (2013.01); *B62B 5/061* (2013.01); *B62B 2205/06* (2013.01)

(58) Field of Classification Search
CPC ..... B62B 3/025; B62B 3/007; B62B 2205/06; B62B 7/008; B62B 7/06; B62B 7/10
See application file for complete search history.

(56) References Cited

U.S. PATENT DOCUMENTS

| | | | | |
|---|---|---|---|---|
| 5,915,723 A * | 6/1999 | Austin | ...................... | B62B 3/02 |
| | | | | 280/47.35 |
| 9,327,749 B2 * | 5/2016 | Young | ...................... | B62B 5/08 |
| 9,440,668 B1 * | 9/2016 | Chen | ...................... | B62B 5/0013 |
| 9,855,962 B1 * | 1/2018 | Chen | ...................... | B62B 3/025 |
| 9,896,118 B2 * | 2/2018 | Choi | ...................... | B62B 3/007 |
| 10,464,588 B1 * | 11/2019 | Lin | ...................... | B62B 7/08 |
| 10,604,170 B1 * | 3/2020 | Davis | ...................... | B62B 3/008 |
| 10,633,010 B1 * | 4/2020 | Zhang | ...................... | B62B 3/025 |
| 11,091,183 B2 * | 8/2021 | Wu | ...................... | B62B 3/007 |

(Continued)

FOREIGN PATENT DOCUMENTS

CN   211912010 U   11/2020
CN   112026897 A   12/2020

(Continued)

OTHER PUBLICATIONS

Translation of CN-116495041-A (Year: 2023).*
Translation of KR-20160118839-A (Year: 2016).*

*Primary Examiner* — Katy M Ebner (57) ABSTRACT

A folding cart comprises a front frame, a rear frame, a side frame arranged between the front frame and the rear frame and used for expanding and folding, and a release mechanism used for restricting or releasing restriction on the folding of the side frame. A force direction applied to trigger the release mechanism is the same as that applied to fold the side frame, the side frame is driven to fold after the release mechanism releases the restriction on the folding of the side frame. In the folding cart, after an external force is applied to trigger the release mechanism to release the folding restriction, the external force in the same direction can be continuously applied to directly drive the side frame to fold. A user only needs to apply force in a single direction to complete dual tasks of unlocking and folding one after another.

8 Claims, 8 Drawing Sheets

(56) References Cited

U.S. PATENT DOCUMENTS

| | | | |
|---|---|---|---|
| 11,465,664 B1* | 10/2022 | Choi | B62B 3/025 |
| 11,772,698 B2* | 10/2023 | Cui | B62B 7/08 |
| | | | 280/650 |
| 11,958,520 B1* | 4/2024 | Sun | B62B 5/067 |
| 11,981,364 B2* | 5/2024 | Ma | B62B 5/0461 |
| 12,179,820 B1* | 12/2024 | Jiang | B62B 3/025 |
| 12,221,150 B1* | 2/2025 | Kuang | B62B 7/08 |
| 12,296,882 B1* | 5/2025 | Wu | B62B 3/025 |
| 12,304,543 B2* | 5/2025 | Jiang | B62B 5/0013 |
| 12,304,547 B2* | 5/2025 | Kuang | B62B 7/062 |
| 2017/0259838 A1* | 9/2017 | Choi | B62B 3/007 |
| 2018/0297622 A1* | 10/2018 | Chen | B62B 5/0003 |
| 2019/0185038 A1* | 6/2019 | Choi | B60B 33/02 |
| 2021/0061332 A1* | 3/2021 | Sturgeon | B62B 3/025 |
| 2021/0291886 A1* | 9/2021 | Zehfuss | B62B 3/007 |
| 2021/0300450 A1* | 9/2021 | Yang | B62B 3/025 |
| 2022/0097748 A1* | 3/2022 | Ma | B62B 5/0433 |
| 2023/0049293 A1* | 2/2023 | Wu | B62B 3/007 |
| 2023/0219608 A1* | 7/2023 | Jiang | B62B 3/025 |
| | | | 280/651 |
| 2023/0242168 A1* | 8/2023 | Clemmer | B62B 3/007 |
| | | | 280/651 |
| 2024/0227907 A1* | 7/2024 | Ma | B62B 5/082 |
| 2025/0002064 A1* | 1/2025 | Jiang | B62B 3/02 |
| 2025/0145200 A1* | 5/2025 | Jianhua | B62B 3/025 |

FOREIGN PATENT DOCUMENTS

| | | | | |
|---|---|---|---|---|
| CN | 116495041 A | * | 7/2023 | B62B 3/02 |
| CN | 221251266 U | | 7/2024 | |
| KR | 20160118839 A | * | 10/2016 | B62B 7/06 |

* cited by examiner

FOLDING CART

CROSS-REFERENCE TO RELATED APPLICATIONS

The application claims priority to Chinese patent application No. 202520516166.2, filed on Mar. 24, 2025, the entire contents of which are incorporated herein by reference.

TECHNICAL FIELD

The present invention belongs to the technical field of carts, and particularly relates to a folding cart.

BACKGROUND

In daily life, as common transportation tools, carts are widely used in various scenarios, such as shopping, transportation of goods and infant outings. However, folding mechanisms of traditional carts typically use independent buttons to release the folding restrictions. When folding the cart, a user needs to find and press the unlock button first, which is typically positioned in specific positions of the cart, such as a side of a frame or near a handle. After the unlock button is pressed, the folding restriction of the cart is released, the user needs to apply another force in another direction to fold the cart together simultaneously, but in this way, the user needs to apply two forces in different directions simultaneously: one is to press the unlock button and another is to fold the cart. The different directions of these forces increase the operational complexity, which makes the operational process more difficult and inconvenient for user. Additionally, since the two directional forces must be applied simultaneously, the user often needs both hands when folding the cart, making one-handed operation impossible, which significantly limits the usage convenience of the cart.

SUMMARY

To solve the problem that the cart in the existing technology needs to be applied two forces in different directions simultaneously in the folding operation, resulting in difficulty and inconvenience, the present invention provides a folding cart.

The present invention is realized through the following technical solutions.

A folding cart comprises a front frame, a rear frame, a side frame for expanding and folding arranged between the front frame and the rear frame, and a release mechanism used for restricting or releasing restriction on the folding of the side frame. A force direction applied to trigger the release mechanism to release restriction is the same as that applied to fold the side frame, after the release mechanism releases restriction on the folding of the side frame, the side frame is driven to fold.

The folding cart as described above, the side frame includes a front top rod and a front bottom rod whose front ends are pivotally connected to an upper side and a lower side of the front frame respectively, a rear top rod and a rear bottom rod whose rear ends are pivotally connected to an upper side and a lower side of the rear frame respectively, a front inclined rod whose front end is pivotally connected to the lower side of the front frame, a rear inclined rod whose rear end is pivotally connected to the lower side of the rear frame, and a pivoting mechanism which is respectively connected with a rear end of the front top rod, a front end of the rear top rod, a rear end of the front inclined rod and a front end of the rear inclined rod, and enables the four ends to be pivotally connected to each other. A rear end of the front bottom rod is pivotally connected to a front end of the rear bottom rod.

The folding cart as described above, the release mechanism includes a front bottom pivot member provided at the rear end of the front bottom rod, the front end of the rear bottom rod is provided with a rear bottom pivot seat pivotally connected to a middle portion of the front bottom pivot member, and a connection pivot pipe arranged between the two adjacent front bottom pivot members. The connection pivot pipe is internally provided with lock pins respectively corresponding to the connection pivot pipes on both sides, and an outer side of the connection pivot pipe is sleeved with sliding sleeves connected to the lock pins. The rear bottom rod is provided with a lock hole for an insertion of the lock pins to restrict the folding of the side frame, and an elastic member is provided between the two lock pins. When the folding cart is in the expanded state, the front bottom pivot member abuts against the rear bottom rod, and the elastic member drives the lock pin to insert into the lock hole.

The folding cart as described above, the release mechanism further includes driving parts connected to the lock pins through a pulling wire, the connection pivot pipe is provided with sliding grooves for the driving parts to pass through and connect to the sliding sleeves, and a pulling member connecting the two sliding sleeves.

The folding cart as described above, when the pulling member is pulled upward, both of the sliding sleeves approach each other under the action of force, driving the two driving parts inside the connection pivot pipe to pull out the corresponding lock pins on both sides from the lock holes, thus to release the restriction on the folding of the side frame. Simultaneously, the side frame folds and drives the front frame and the rear frame to approach each other, thereby completing the folding of the folding cart.

The folding cart as described above, the pivoting mechanism is pivotally connected to the front top rod through a front top pivot seat, a front side of the front top pivot seat is pivotally connected to the rear end of the front top rod and a rear side of the front top pivot seat is pivotally connected to the pivoting mechanism. The pivoting mechanism is pivotally connected to the rear top rod through a rear top pivot seat, a rear side of the rear top pivot seat is pivotally connected to the front end of the rear top rod and a front side of the rear top pivot seat is pivotally connected to the pivoting mechanism.

The folding cart as described above, the side frame further includes a locking mechanism for keeping the folding cart in a folded state when the folding cart is in the folded state, the locking mechanism includes a folding buckle and a folding hook fastened on the folding buckle. The folding buckle is provided on the front inclined rod and the folding hook is provided on the rear inclined rod; or the folding buckle is provided on the rear inclined rod and the folding hook is provided on the front inclined rod.

The folding cart as described above, a slope face is arranged on an end of the lock pin close to the lock hole.

The folding cart as described above, the connection pivot pipe has a prismatic shape, and the driving part and the lock pin are correspondingly configured as a prismatic shape.

The folding cart as described above, the front top pivot seat is provided with a front support rod extending downward to be pivotally connected to the front bottom rod, and the rear top pivot seat is provided with a rear support rod extending downward to be pivotally connected to the rear bottom rod.

Compared with the prior art, the present invention has the following advantages.

In the folding cart according to the present invention, after an external force is applied to trigger the release mechanism to release restriction to release the folding restriction, the external force in the same direction can be continuously applied to directly drive the side frame to fold. The user only needs to apply force in a single direction to complete the dual tasks of unlocking and folding one after another, without additionally applying forces in other directions to drive the cart to fold.

BRIEF DESCRIPTION OF DRAWINGS

In order to more clearly illustrate the technical solutions in the embodiments of the present invention, the drawings needed in the descriptions of the embodiments will be briefly introduced hereafter. Apparently, the following described drawings are merely a part of the embodiments of the present invention, other drawings can be obtained by those of ordinary skill in the art according to these drawings without any creative works.

DETAILED DESCRIPTION OF THE EMBODIMENTS

In order to make the technical problems, technical solutions and beneficial effects solved by the present invention more clearly, the present invention is further illustrated hereafter in combination with the drawings and embodiments. It should be understood that the embodiments described here are only used to explain the present invention but not to limit the present invention.

Figure 1:
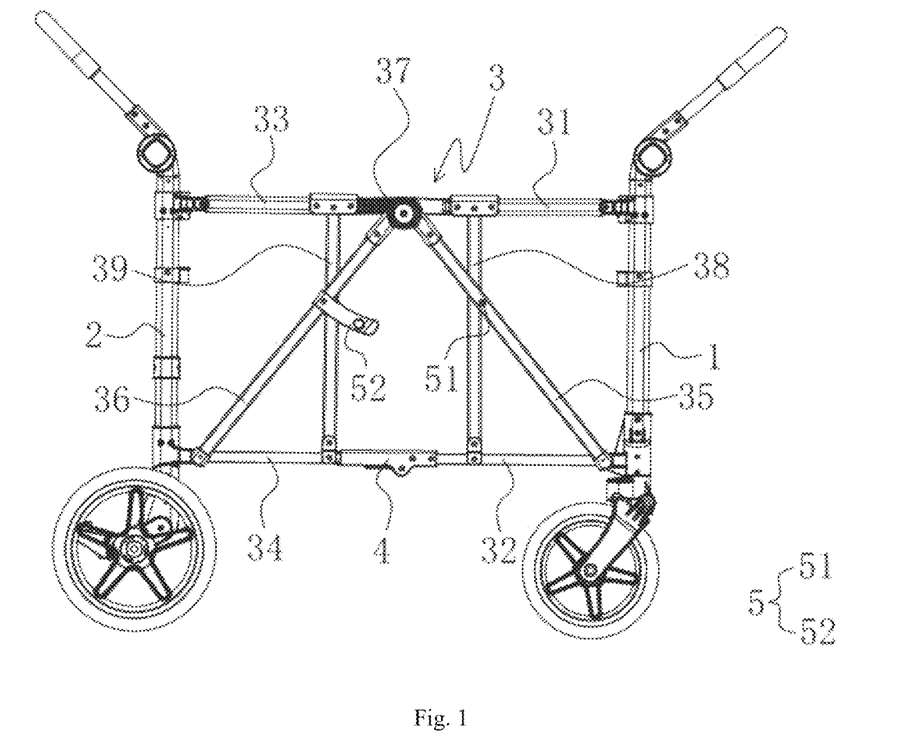
FIG. 1 is a front view of a folding cart in a expanded state according to an embodiment of the present invention.
Figure 2:
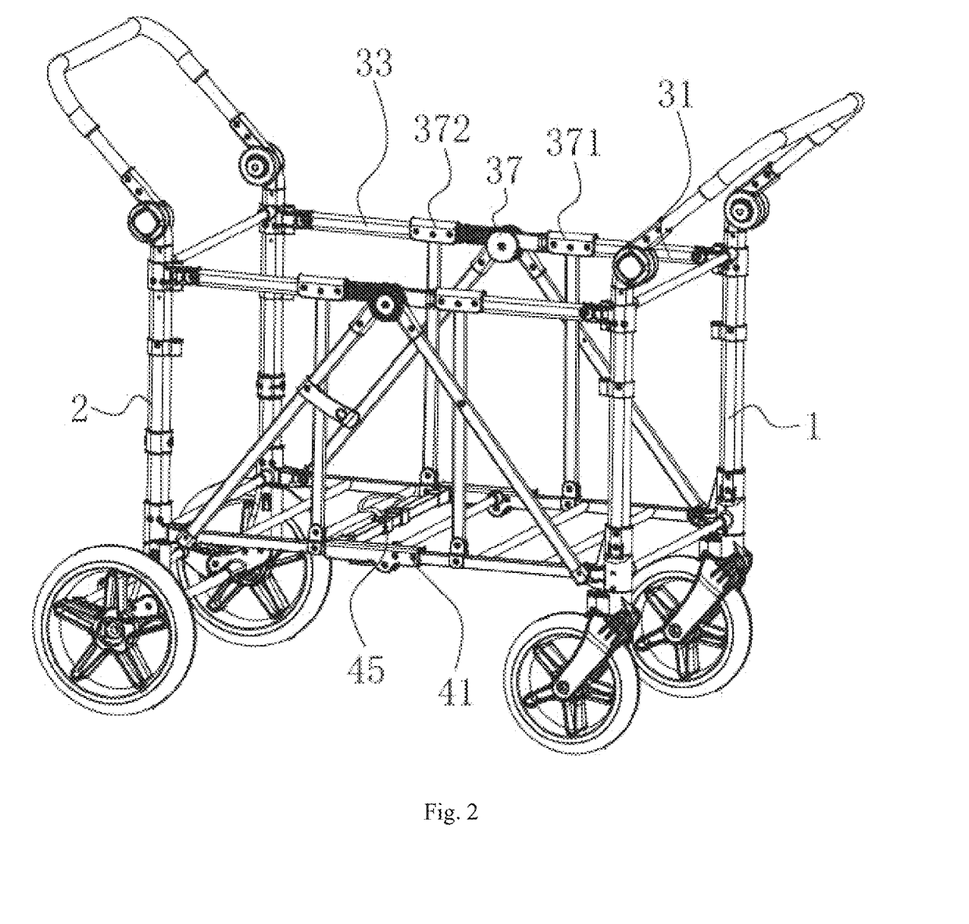
FIG. 2 is a three-dimensional view of FIG. 1.
Figure 3:
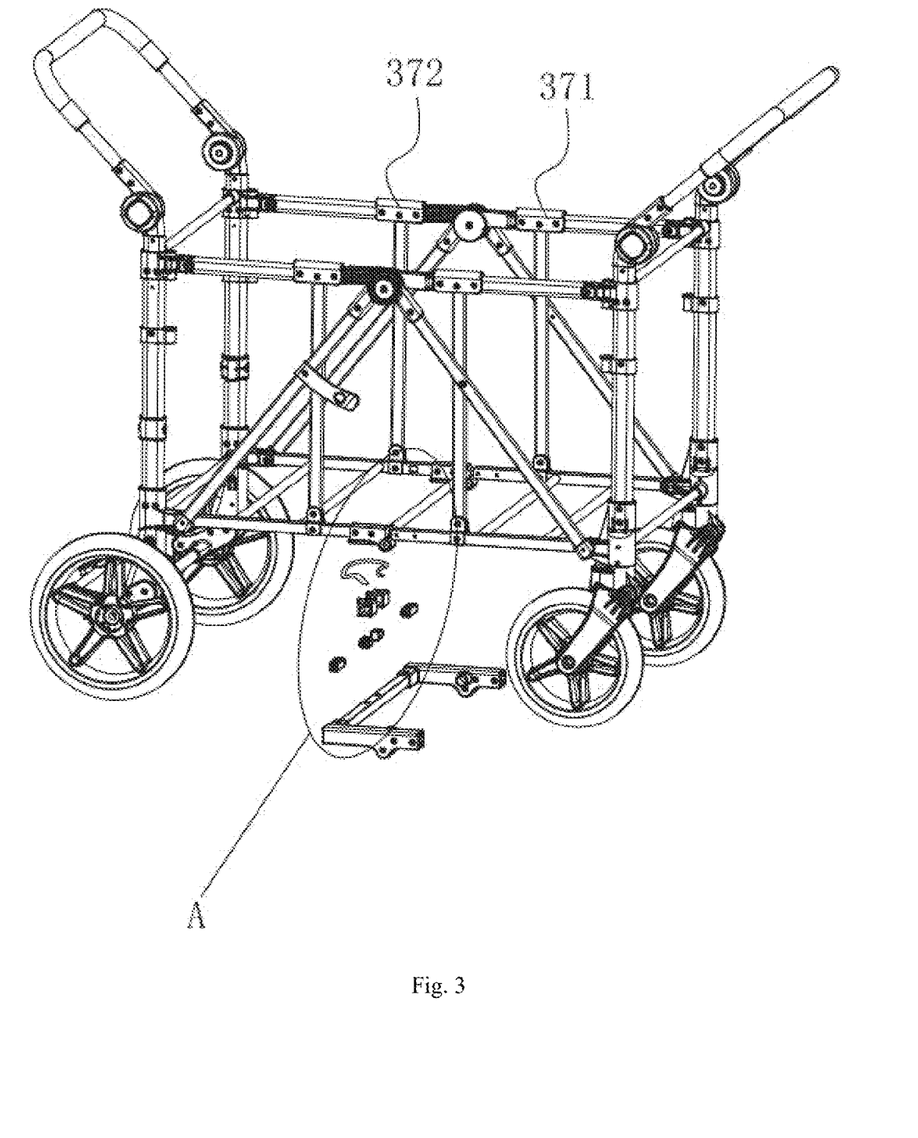
FIG. 3 is a partially exploded view of FIG. 2.
Figure 4:
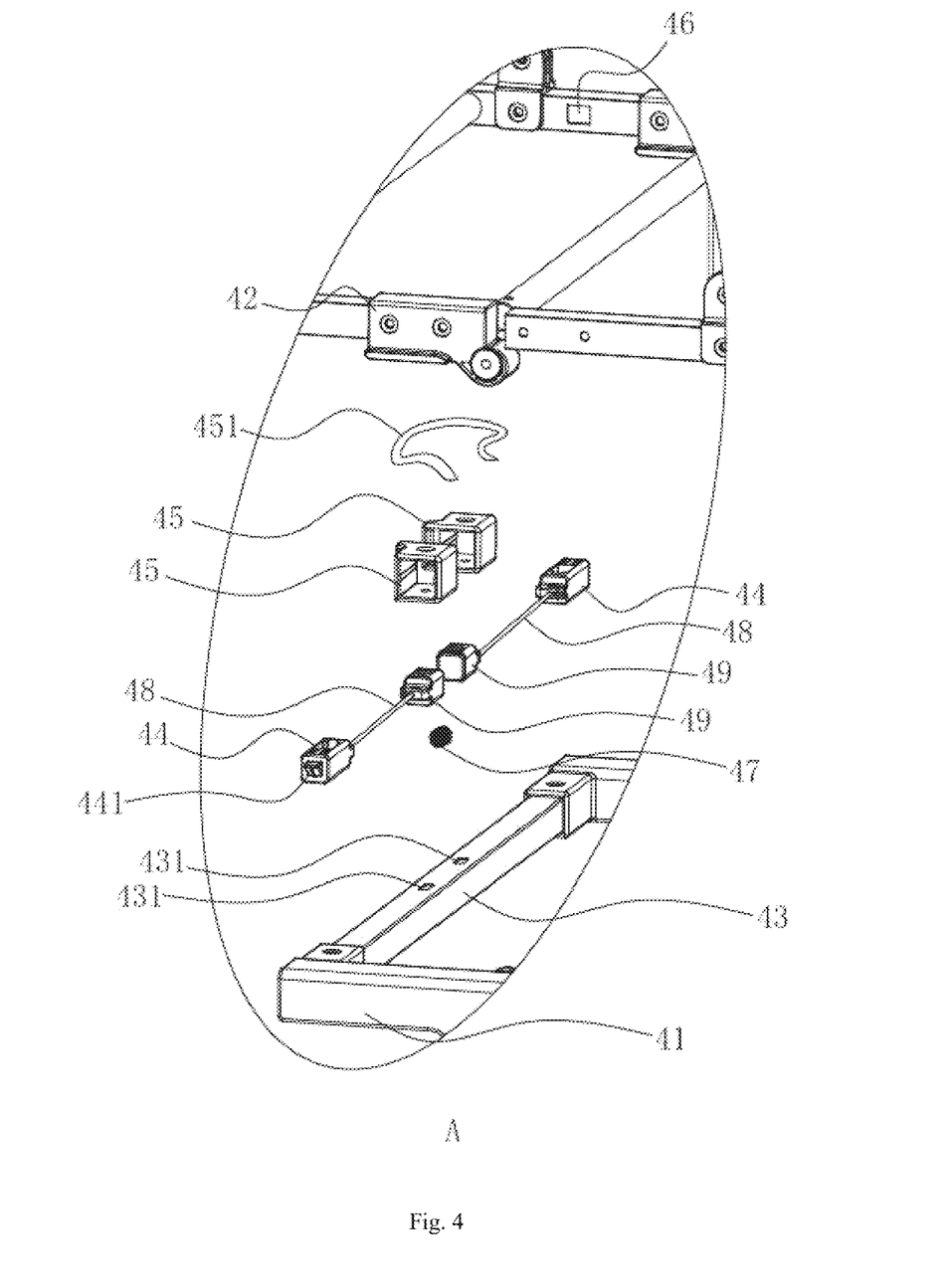
FIG. 4 is an enlarged view of Part A in FIG. 3.
Figure 5:
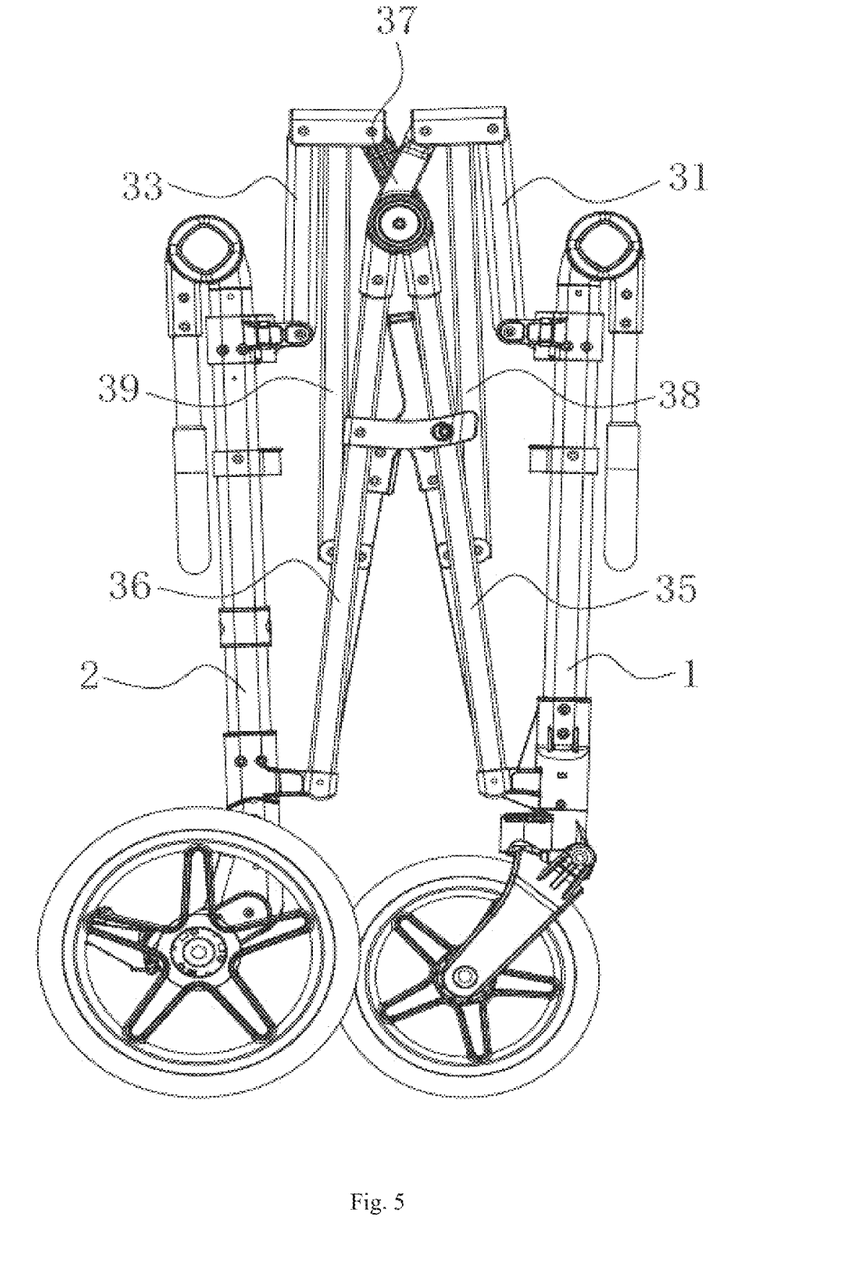
FIG. 5 is a front view of the folding cart in a folded state according to the embodiment of the present invention.
Figure 6:
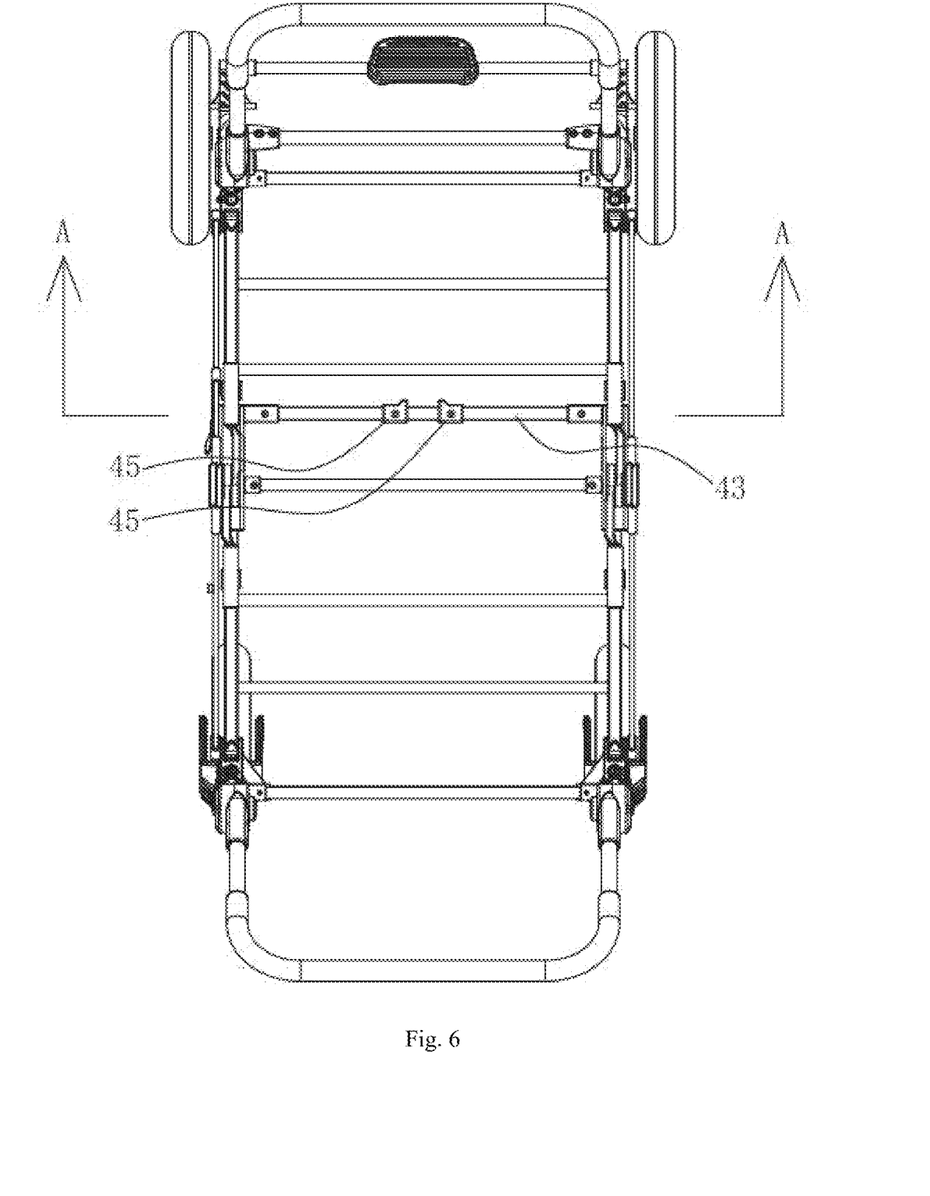
FIG. 6 is a top view of FIG. 1.
Figure 7:
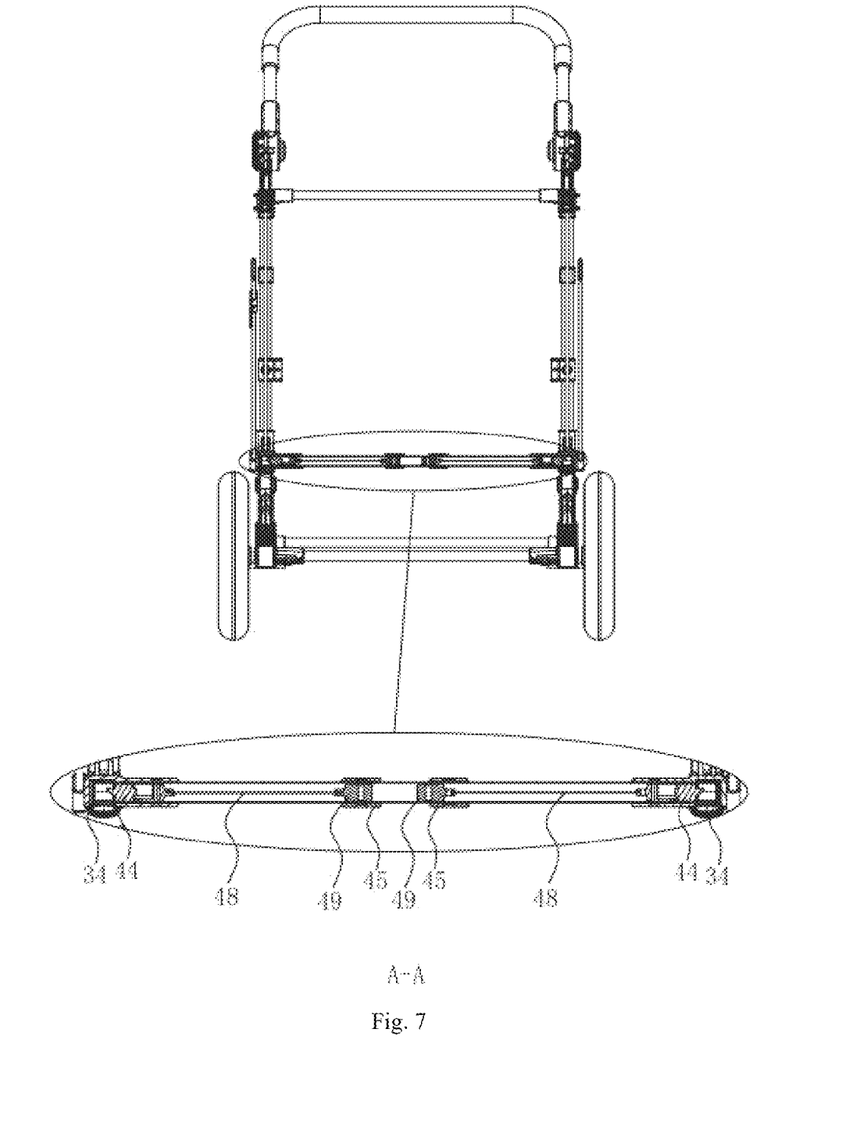
FIG. 7 is a schematic cross-sectional view of line A-A in FIG. 6 when it's restricted.
Figure 8:
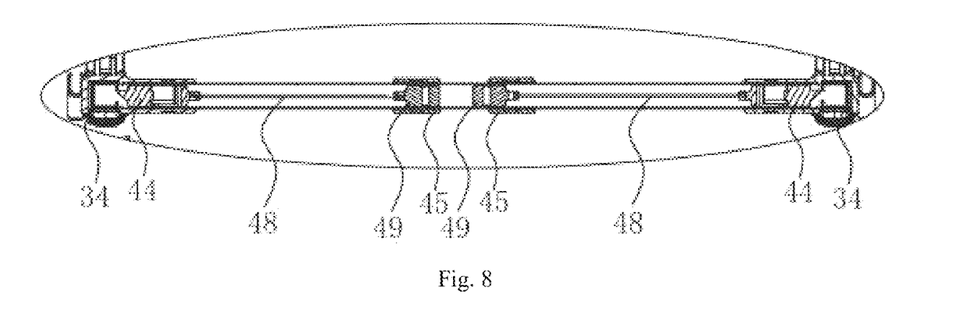
FIG. 8 is a schematic cross-sectional view of line A-A in FIG. 6 when restriction is released.

Please refer to FIGS. 1-8, a folding cart comprises a front frame 1, a rear frame 2, a side frame 3 arranged between the front frame 1 and the rear frame 2 and used for expanding and folding, and a release mechanism 4 used for restricting or releasing restriction on the folding of the side frame 3. A force direction applied to trigger the release mechanism 4 to release restriction is the same as that applied to fold the side frame 3, after the release mechanism 4 releases the restriction on the side frame, the side frame 3 is driven to fold.

According to the folding cart of the present invention, after an external force is applied to trigger the release mechanism to release the folding restriction, the external force in the same direction can be continuously applied to directly drive the side frame to fold. A user only needs to apply force in a single direction to complete the dual tasks of unlocking and folding one after another, without additionally applying forces in other directions to drive the cart to fold.

Further, as the preferred implementation method of this scheme rather than limited, the side frame 3 includes a front top rod 31 and a front bottom rod 32 whose front ends are pivotally connected to upper and lower sides of the front frame 1, respectively, a rear top rod 33 and a rear bottom rod 34 whose rear ends are pivotally connected to upper and lower sides of the rear frame 2, respectively, a front inclined rod 35 whose front end is pivotally connected to the lower side of the front frame 1, a rear inclined rod 36 whose rear end is pivotally connected to the lower side of the rear frame 2, and a pivoting mechanism 37 which is respectively connected with a rear end of the front top rod 31, a front end of the rear top rod 37, a rear end of the front inclined rod 35 and a front end of the rear inclined rod 36, and enables the four ends to be pivotally connected to each other. A rear end of the front bottom rod 32 is pivotally connected to a front end of the rear bottom rod 34.

In this embodiment, the design of the side frame 3 forms a flexible and stable structure by skillfully connecting and pivoting the front top rod 31, the front bottom rod 32, the rear top rod 33, the rear bottom rod 34, the front diagonal rod 35, and the rear diagonal rod 36, so that the folding cart can keep steady and smooth in the process of expanding and folding, ensuring that the side frame 3 can stably support the whole cart in the expanding state. The configuration of the front diagonal rod 35 and the rear diagonal rod 36 not only enhances the stability of the cart, but also provides the essential guidance and support during the folding process. As a critical connection point, the pivoting mechanism 37 pivotally interconnects the front top rod 31, the rear top rod 33, the front diagonal rod 35 and the rear diagonal rod 36, so that these rods can move together to realize the expanding and folding of the cart. Additionally, the rear end of the front bottom rod 32 is pivotally connected to the front end of the rear bottom rod 34 to further enhance the stability and flexibility of the side frame 3. When the cart needs to be folded, the user triggers the release mechanism 4 to release the folding restriction on the side frame 3, and then applies a force in one direction, and the force is transmitted through the pivotal relationship of these rods, and thus guiding the side frame 3 to fold in an orderly manner. Since all the rods are pivotally connected, they can be folded together in a coordinated manner without jamming or interference.

Further, as the preferred implementation method of this scheme rather than limited, the release mechanism 4 includes a front bottom pivot member 41 provided at the rear end of the front bottom rod 32. The front end of the rear bottom rod 34 is provided with a rear bottom pivot seat 42 pivotally connected to a middle portion of the front bottom pivot member 41, and a connection pivot pipe 43 arranged between the two adjacent front bottom pivot members 41. The connection pivot pipe 43 is internally provided with lock pins 44 respectively corresponding to the connection pivot pipes 43 on both sides, and an outer side of the connection pivot pipe 43 is sleeved with sliding sleeves 45 connected to the lock pins 44; the rear bottom rod 34 is provided with lock holes 46 for the insertion of the lock pins 44 to restrict the folding of the side frame 3, and an elastic member 47 is provided between the two lock pins 44. When the folding cart is in the expanded state, the front bottom pivot member abuts against the rear bottom rod, and the elastic member drives the lock pins to insert into the lock hole.

In this embodiment, precise control of the folding state of the side frame 3 is achieved, which provides users with a convenient and reliable operation experience. The front bottom pivot member 41 is provided on the rear end of the front bottom rod 32 and is pivotally connected to the rear bottom pivot seat 42 at the front end of the rear bottom rod 34, and this connection manner ensures the stability of the side frame 3 in the unfolded state. The connection pivot pipe 43 is provided between the two adjacent front bottom pivot members 41, and the lock pins 44 are provided inside the connection pivot pipe 43 on both sides. These lock pins 44 can automatically insert into the lock holes 46 on the rear bottom rod 34 under the action of elastic member 47 (such as spring, etc.), so as to lock the side frame 3 and prevent it from accidentally folding in the unfolded state. The sliding sleeves 45 are sleeved on outer sides the connection pivot pipes 43 and connected with the locking pins 44. When the user needs to fold the cart, by operating the sliding sleeves 45, the elastic force of the elastic member 47 can be overcome, so that the elastic member is compressed, and the lock pin 44 is pulled out from the lock hole 46 to release the lock of the side frame 3. Since the sliding sleeve 45 is directly connected to the lock pin 44, the user only needs to make a simple sliding motion to complete the unlocking, without hard pressing or toggle other complex switches, which not only simplifies the operational steps, but also improves the operational accuracy and reliability.

Further, as the preferred implementation method of this scheme rather than limited, the release mechanism 4 further includes driving parts 49 connected to the lock pins 44 through a pulling wire 48. The connection pivot pipe 43 is provided with sliding grooves 431 for the driving part 49 to pass through and connect to the sliding sleeves 45, and a pulling member 41 for connecting the two sliding sleeves 45.

In this embodiment, the driving parts 49 are connected to the lock pins 44 through the pulling wire 48. In this way, the user can control the movement of the lock pins 44 through the pulling wire 48 when operating the sliding sleeves 45, so that the contact area between the lock pins and the inner wall of the connection pivot pipe is reduced, thereby reducing the friction. The sliding grooves 431 are provided on the connection pivot pipe 43, providing space for the connection between the driving parts 49 and the sliding sleeves 45. The pulling member 451 connects the two sliding sleeves 45, so that the user can simultaneously release the lock pins 44 on both sides with a simple pulling action, which can significantly simplify the operation process.

When folding the cart, the user pulls the pulling member 451 upward, so the two sliding sleeves 45 approach each other under the pulling force. This motion is transmitted to the lock pins 44 through the driving parts 49 and the pulling wire 48, overcoming the elastic force of the elastic member 47 and pulling out the lock pins 44 from the lock holes 46, thereby releasing the lock of the side frame 3. Since the pulling member 451 acts on both sliding sleeves 45 at the same time, the lock pins 44 on both sides can move synchronously, ensuring the consistency and stability of the unlocking process. This design not only avoids the trouble that the user needs to operate the lock pins on both sides separately, but also reduces the risk of unstable or accidental deployment of the cart due to asynchronous operation.

Further, as the preferred implementation method of this scheme rather than limited, when the pulling member 451 is pulled upward, both of the sliding sleeves 45 approach each other under the action of pulling force, driving the two driving parts 49 inside the connection pivot pipe 43 to pull out the corresponding lock pins 44 on both sides from the lock holes 4, thereby releasing the restriction on the folding of the side frame 3. Simultaneously, the side frame 3 folds and drives the front frame 1 and the rear frame 2 to approach each other, thereby completing the folding of the folding cart.

Further, as the preferred implementation method of this scheme rather than limited, the pivoting mechanism 37 is pivotally connected to the front top rod 31 through a front top pivot seat 371, a front side of the front top pivot seat 371 is pivotally connected to the rear end of the front top rod 31 and a rear side of the front top pivot seat 371 is pivotally connected to the pivoting mechanism 37. The pivoting mechanism 37 is pivotally connected to the rear top rod 33 through a rear top pivot seat 372, a rear side of the rear top pivot seat 372 is pivotally connected to the front end of the rear top rod 33 and a front side of the rear top pivot seat 372 is pivotally connected to the pivoting mechanism 37.

In this embodiment, the front top rod 31 is ensured to rotate around the pivoting mechanism 37, so as to realize the expanding and folding of the cart. The rear side of the rear top pivot seat 372 is pivotally connected to the front end of the rear top rod 33 and the front side of the rear top pivot seat 372 is pivotally connected to the pivoting mechanism 37, so that the rear top rod 33 can also rotate around the pivoting mechanism 37, which not only ensures synchronized movement between the front top rod 31 and the rear top rod 33, but also provides the essential flexibility for the folding of the side frame 3. When the cart needs to be expanded, the front top rod 31 and the rear top rod 33 rotate forward and backward respectively under the guidance of the pivoting mechanism 37, so that the side frame 3 is expanded and supports the entire cart. When the cart needs to be folded, the front top rod 31 and the rear top rod 33 rotate in reverse, so that the side frame 3 is folded together. Due to the existence of the front top pivot seat 371 and the rear top pivot seat 372, this rotational motion can be carried out in a stable and controllable manner without excessive rotation or jamming.

Further, as the preferred implementation method of this scheme rather than limited, it further includes a locking mechanism 5 for keeping the folding cart in a folded state when the folding cart is folded by the side frame 3. The locking mechanism 5 includes a folding buckle 51 and a folding hook 52 fastened on the folding buckle 51, the folding buckle 51 is provided on the front inclined rod 35 and the folding hook 52 is provided on the rear inclined rod 36; or the folding buckle 51 is provided on the rear inclined rod 36 and the folding hook 52 is provided on the front inclined rod 35.

In this embodiment, the folding buckle 51 and the folding hook 52 are respectively provided on the front inclined rod 35 and the rear inclined rod 36 or respectively provided on the rear inclined rod 36 and the front inclined rod 35. After the cart is fully folded, the folding hook 52 can accurately fastened on the folding buckle 51 to form a stable locked state. This design not only prevents the cart from accidentally expanding during carrying or storage, but also has a precise fit and mechanical strength between the folding buckle 51 and folding hook 52. Once fastened, it can provide a reliable locking force to prevent the cart from accidentally expanding. When the cart needs to be used again, the user only needs to simply disengage the buckle between the folding hook 52 and the folding buckle 51, and the cart can be easily expanded.

Further, as the preferred implementation method of this scheme rather than limited, a slope face 441 is arranged on an end of the lock pin 44 close to the lock hole 46.

In this embodiment, the configuration of the slope face 441 can improve operational smoothness. This smooth transition not only reduces the wear and jamming among mechanical components, but also improves the operational stability and durability of the entire release mechanism 4. Especially in the case of frequent use of the cart, this design can significantly prolong the service life of the lock pins 44 and lock holes 46, and reduce the frequency of maintenance and replacement.

Further, as the preferred implementation method of this scheme rather than limited, the connection pivot pipe 43 has a prismatic shape, and the driving part 49 and the lock pin 44 are correspondingly configured as prismatic shapes.

In this embodiment, the prismatic design provides a stable and accurate motion guidance for the driving parts 49 and the lock pins 44. The corresponding prismatic configuration of the driving parts 49 and lock pins 44 enables them to closely match with the connection pivot pipe 43 and move along a predetermined trajectory, which not only prevents rotational deviation of the driving parts 49 and lock pins 44 during movement, but also ensures accurate transmission of force and motion, thereby achieving accurate control of the folding state of the side frame 3.

Further, as the preferred implementation method of this scheme rather than limited, the front top pivot seat 371 is provided with a front support rod 38 extending downward to be pivotally connected to the front bottom rod 32, and the rear top pivot seat 372 is provided with a rear support rod 39 extending downward to be pivotally connected to the rear bottom rod 39.

In this embodiment, an additional supporting frame is formed to work in concert with the original side frame 3. When the cart is in the expanded state, this design can effectively distribute loads and reduce frame deformation or shaking caused by single point stress, thereby enhancing the overall stability of the cart. This additional supporting frame can significantly enhance the cart's load-bearing capacity and shock resistance performance, especially when carrying heavy loads or operating on uneven load surfaces.

The working principle of this embodiment is as follows.

In the folding cart of the present invention, after an external force is applied to trigger the release mechanism to release the folding restriction, the external force in the same direction can be continuously applied to directly drive the side frame to fold. The user only needs to apply force in a single direction to complete the dual tasks of unlocking and folding one after another, without additionally applying forces in other directions to drive the cart to fold.

The above described is the implementation method provided in combination with the specific contents. It is not determined that the specific embodiments of the present invention are limited to these descriptions. Any methods and structures that are similar to the present invention, or any technical deductions or substitutions made under the premises of the present invention, should be regarded as the protection scope of the present invention.

What is claimed is:

1. A folding cart, comprising a front frame, a rear frame, a side frame for expanding and folding arranged between the front frame and the rear frame, and a release mechanism used for restricting or releasing restriction on the folding of the side frame;
    wherein a force direction applied to trigger the release mechanism to release restriction is the same as that applied to fold the side frame, after the release mechanism releases restriction on the folding of the side frame, the side frame is driven to fold,
    wherein the side frame includes:
        a front top rod and a front bottom rod, whose front ends are pivotally connected to an upper side and a lower side of the front frame, respectively;
        a rear top rod and a rear bottom rod, whose rear ends are pivotally connected to an upper side and a lower side of the rear frame, respectively;
        a front inclined rod, whose front end is pivotally connected to the lower side of the front frame;
        a rear inclined rod, whose rear end is pivotally connected to the lower side of the rear frame; and
        a pivoting mechanism, which is respectively connected to a rear end of the front top rod, a front end of the rear top rod, a rear end of the front inclined rod and a front end of the rear inclined rod, and enables the four ends to be pivotally connected to each other;
    wherein a rear end of the front bottom rod is pivotally connected to a front end of the rear bottom rod,
    wherein the release mechanism includes a front bottom pivot member provided at the rear end of the front bottom rod;
    the front end of the rear bottom rod is provided with a rear bottom pivot seat pivotally connected to a middle portion of the front bottom pivot member, a connection pivot pipe provided between two adjacent front bottom pivot members;
    lock pins are configured internally in the connection pivot pipe corresponding to the connection pivot pipes on both sides, respectively, an outer side of the connection pivot pipe is sleeved with sliding sleeves connected to the lock pins;
    the rear bottom rod is provided with a lock hole for an insertion of the lock pins to restrict the folding of the side frame, an elastic member is provided between the two lock pins;
    when the folding cart is in the expanded state, the front bottom pivot member abuts against the rear bottom rod, and the elastic member drives the lock pin to insert into the lock hole.

2. The folding cart according to claim 1, wherein the release mechanism further includes driving parts connected to the lock pins through a pulling wire, the connection pivot pipe is provided with sliding grooves for the driving parts to pass through and connect to the sliding sleeves, and a pulling member connecting the two sliding sleeves.

3. The folding cart according to the claim 2, wherein when the pulling member is pulled upward, both of the sliding sleeves approach each other under a pulling force, driving the two driving parts inside the connection pivot pipe to pull out the corresponding lock pins on both sides from the lock holes, thus to release the restriction on the folding of the side frame; simultaneously, the side frame folds and drives the front frame and the rear frame to approach each other, thereby completing the folding of the folding cart.

4. The folding cart according to claim 1, wherein the pivoting mechanism is pivotally connected to the front top rod through a front top pivot seat, a front side of the front top pivot seat is pivotally connected to the rear end of the front top rod, a rear side of the front top pivot seat is pivotally connected to the pivoting mechanism; and
    the pivoting mechanism is pivotally connected to the rear top rod through a rear top pivot seat, a rear side of the rear top pivot seat is pivotally connected to the front end of the rear top rod, a front side of the rear top pivot seat is pivotally connected to the pivoting mechanism.

5. The folding cart according to claim 1, wherein the folding cart further includes a locking mechanism for keeping the folding cart in a folded state when the folding cart is folded, the locking mechanism includes a folding buckle and a folding hook fastened on the folding buckle, the folding buckle is provided on the front inclined rod and the folding hook is provided on the rear inclined rod; or the folding buckle is provided on the rear inclined rod and the folding hook is provided on the front inclined rod.

6. The folding cart according to claim 1, wherein a slope face is arranged on an end of the lock pin close the lock hole.

7. The folding cart according to claim 2, wherein the connection pivot pipe has a prismatic shape, and the driving part and the lock pin are correspondingly configured as prismatic shapes.

8. The folding cart according to claim 4, wherein a front support rod is configured at the front top pivot seat, extending downwards to be pivotally connected to the front bottom rod, and a rear support rod is configured at the rear top pivot seat, extending downwards to pivotally connected to the rear bottom rod.

* * * * *